United States Patent [19]

Cadeddu

[11] 4,398,558
[45] Aug. 16, 1983

[54] SAFETY VALVE FOR VACUUM CONTROL CIRCUITS

[75] Inventor: Leonardo Cadeddu, Crema, Italy

[73] Assignee: Benditalia S.p.A., Crema, Italy

[21] Appl. No.: 276,128

[22] Filed: Jun. 22, 1981

Related U.S. Application Data

[63] Continuation of Ser. No. 121,077, Feb. 13, 1980, abandoned.

[30] Foreign Application Priority Data

Feb. 14, 1979 [IT] Italy .............................. 20176 A/79

[51] Int. Cl.³ .............................................. F16K 17/34
[52] U.S. Cl. ........................................ 137/498; 92/86; 137/514.5; 251/54
[58] Field of Search ...................... 137/460, 498, 514.5, 137/514.7, 517; 92/8, 11, 12, 86; 188/311; 251/54

[56] References Cited

U.S. PATENT DOCUMENTS

| 2,518,988 | 8/1950 | Hartley | 137/514.7 X |
| 2,583,295 | 1/1952 | Greer | 137/514.7 X |
| 2,917,077 | 12/1959 | Ziege | 137/514.7 |
| 2,927,605 | 3/1960 | Stephens | 137/514.5 |
| 2,954,047 | 9/1960 | Flatejsek | 137/514.5 X |
| 3,085,589 | 4/1963 | Sands | 137/514.5 X |
| 3,094,902 | 6/1963 | Riopelle | 92/12 |
| 3,735,777 | 5/1973 | Katzer | 137/514.5 |
| 3,779,273 | 12/1973 | Stone | 137/514.7 X |
| 3,869,963 | 3/1975 | Schindel | 92/86 |
| 4,091,838 | 5/1978 | Dowty | 137/514.5 |
| 4,221,204 | 9/1980 | Meyer | 251/54 X |

FOREIGN PATENT DOCUMENTS 1136879 5/1957 France .............................. 137/498

Primary Examiner—Robert G. Nilson
Attorney, Agent, or Firm—Leo H. McCormick, Jr.; Ken C. Decker

[57] ABSTRACT

A safety valve for isolating a portion of a service conduit from a vacuum generator should a leak occur in that portion of the service circuit. The safety valve has a housing with a chamber therein. The chamber has an inlet port connected to the service circuit and an outlet port connected to the vacuum generator. A wall member located in the chamber is biased by a spring toward a first position whereby the vacuum generator is connected to the service circuit. Should a leak occur in the service circuit, air flow through the chamber acts on the wall to overcome the resistance of the spring and moves the wall to a second position to seal the chamber and thereby interrupts air flow through the chamber to the vacuum generator.

3 Claims, 2 Drawing Figures

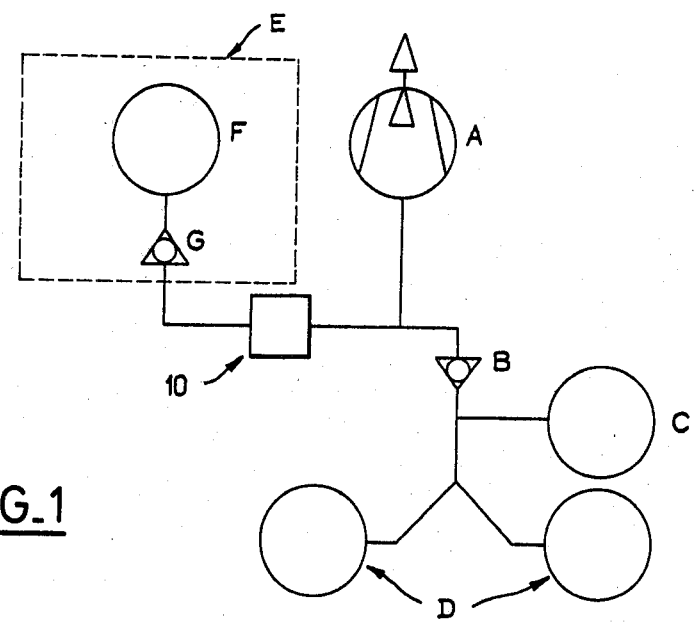
FIG_1
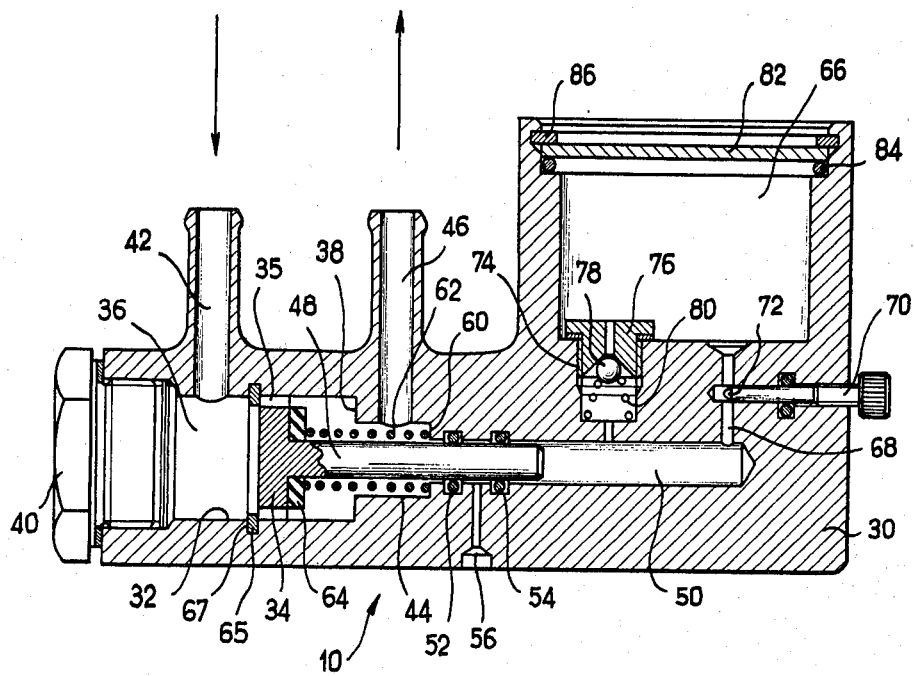
FIG_2

SAFETY VALVE FOR VACUUM CONTROL CIRCUITS

This is a continuation of application Ser. No. 121,077, filed Feb. 13, 1980, now abandoned.

BACKGROUND OF THE INVENTION

This invention relates to a safety valve for use in a vacuum control circuit to isolate a portion of the circuit in case of a leak therein.

Vacuum control circuits which are incorporated in recent vehicles are connected to safety devices such as power assisted brakes which must be actuated in priority, and to auxiliary devices such as projector level adjusters or anti-freeze screen control mechanisms.

Unfortunately in case of leakage in one of the auxiliary devices, the vacuum level drops in the whole circuit and could render the safety devices inoperative.

SUMMARY OF THE INVENTION

With a view to isolating the faulty portion of the circuit and to permitting a normal operation of the safety devices until the faulty portion has been repaired, the invention proposes a safety valve. That safety valve has a movable member located in a chamber connected to a service circuit through an inlet port and on the other hand to a vacuum generator through an outlet port. The movable member is responsive to the air flow through the chamber upon occurrence of a leak. The movable member is connected to a valve member located downstream from the leak. A resilient member biases the movable member towards a rest position in which said valve member is open. Air flow through the chamber acts on the movable member and overcomes the resilient member to move the movable member towards a second position in which said valve member is closed, and the leak isolated from the vacuum generator.

An advantage of this invention occurs through the protection provided by the safety device should a leak develop in an auxiliary circuit by isolating the leak from a vacuum generator.

BRIEF DESCRIPTION OF THE DRAWINGS

FIG. 1 is a diagrammatic view of a vacuum control circuit incorporating a safety valve made according to the principles of this invention; and FIG. 2 is a sectional view of said safety valve in FIG. 1.

DETAILED DESCRIPTION OF THE INVENTION

In the vacuum circuit shown in FIG. 1, a vacuum generator A is connected through a non-return valve B to a priority service circuit having an accumulator C and power assisted brakes D. The generator A is connected to an auxiliary service circuit E having auxiliary device F and a non-return valve G. A safety valve (10) is interposed between the generator A and the service circuit E from the generator A in case of leakage therein.

The safety valve (10) shown in FIG. 2 has housing (30) with a bore (32) therein a movable disc (34) is located in bore (32). The bore (32) forms a chamber (36) which is limited by the end wall (38) of the bore and by a screw plug (40). The chamber (36) is connected to the service circuit E through an inlet port (42) which opens radially in the bore (32) in the vicinity of the plug (40). A second bore (44) coaxial to the bore (32) opens in the latter through the end wall (38). The chamber (36) is connected to the vacuum generator A through an outlet port (46) opening radially in the central portion of the second bore (44).

The disk (34) is provided at it periphery with axial passages (35). The disk (34) has a coaxial stem (48) that extends through the second bore (44) and into a blind bore (50). Two seals (52 and 54) are axially spaced in housing (30), between a drain port (56) opening radially in the blind bore (50). The blind bore (50) opens in the second bore (44) through the end wall (60) of the second bore (44). However, the seals (52 and 54) engage stem (48) to seal drain port (56) from the second bore (44) and blind bore (50).

A spring (62) is located in the second bore (44) and projects into the chamber (36). One end of the spring (62) abuts the end wall (60) and the other end of the spring (62) engages a valve member (64) attached to the movable disk (34). The spring (62) urges the disc (34) to a rest position in abutment against a stop washer (65) received within a groove (67) formed in the bore (32).

The valve member (64) is made of resilient material and has substantially the form of an annular disk surrounding the stem (48) and located against the disk (34). The outer diameter of the valve member (64) is larger than the diameter of the second bore (44), but narrower than the outer diameter of the disk (34) so as not to obstruct the passages (35).

In order to permit a damping of the displacements of the stem (48) within the blind bore (50), blind bore (50) is connected to a cylindrical tank (66) by a first conduit (68). Conduit (68) opens radially in the blind bore (50) near the end of the latter. A flow restrictor member is provided in the conduit (68). The restrictor member has an adjustable screw (70) whose pointed end (72) projects into the conduit (68). A second conduit (74) connects the tank (66) with the blind bore (50). A non-return valve (76) and includes a ball (68) and a spring (80) is located in conduit (74) so as to permit a quick fill of the blind bore (50). The tank (66) is closed at its upper part by means of a cover (82) maintained in engagement against a sealing gasket (84) by a spring washer (86). The tank (66) is filled with a fluid which is preferably oil. The cover (82) is provided with a part (not shown) which permits connection between the inside of the tank atmosphere.

OPERATION OF THE INVENTION

Upon starting the operation of the system, any air present within the service circuit E is exhausted by the vacuum generator A through the valve (10). Air flows through the chamber (36) through the passages (35) and reacts upon the disk (34) which is subsequently displaced against the bias exerted by the spring (62). The displacement of the disk (34) is damped due to the restriction of the fluid which flows through conduit (68) from the blind bore (50) towards the tank (66). If there is no leakage, the air initially present within auxiliary or service circuit E is quickly exhausted and the disk (34) is not displaced sufficiently to close the second bore (44) by engagement of valve member (64) with end wall (38).

As soon as exhaustion is completed the air flow stops and the disk (34) is rapidly shifted back to its rest position under the bias of the spring (62), the blind bore (50) being quickly filled through the conduit (74).

In case of leakage, the air flow through chamber (36) acts on the disk (34) until the valve member (44) comes in tight abutment against the end wall (60) to interrupt the air flow. As long as a pressure differential prevails between the inlet port (42) and the outlet port (46) the valve member (64) remains in the closed position, thereby isolating the leak in circuit E from the vacuum generator A.

What is claimed is:

1. In a safety valve for use in a vacuum system to isolate an auxiliary circuit from a vacuum generator should a leak occur in the auxiliary circuit, said safety valve comprising:

a housing having a chamber and a blind bore, said blind bore having a first end and a second end therein, said chamber having an inlet port connected to said auxiliary circuit and an outlet port connected to said vacuum generator, said housing having a valve seat located between the inlet and outlet ports;

a flow-responsive movable member located between said inlet and outlet ports;

a first valve member connected to said movable member upstream said valve seat;

a stop member located in said chamber;

resilient means for biasing said movable member toward a first rest position against stop member in which said first valve member is away from said valve seat;

a piston located in said blind bore, said piston being connected to said movable member;

a first conduit for connecting the first end of said blind bore to a reservoir;

a second conduit for connecting the second end of said blind bore to the reservoir, said reservoir, first and second conduits and blind bore forming a closed circuit which allows fluid to flow between the reservoir and said blind bore, said movable member responding to a predetermined rate of air flow from the auxiliary circuit through the chamber by overcoming said resilient means to move said first valve member from said first rest position toward said valve seat and said piston from a second rest position past said second conduit and toward said first conduit, said piston movement communicating fluid from said blind bore to said reservoir through said first conduit;

first and second seals located in said blind bore and engaging said piston to separate said chamber and blind bore;

a drain port located between said first and second seals to provide a flow path to the surrounding environment for any fluid that may seep past said first seal from said blind bore and thereby avoid fluid contamination of said chamber by said fluid;

a restriction member located in said first conduit for controlling the flow rate of fluid between said blind bore and reservoir, said restriction member being adjustable to control said flow rate and correspondingly the time required to move said valve into engagement with said valve seat to interrupt communication of air to said vacuum generator; and a second valve member located in said second conduit to prevent fluid flow from said blind bore toward said reservoir while allowing free flow of fluid from said reservoir to said blind bore of movement of the piston toward said second rest position to assure that the bore is full of fluid at all times.

2. Safety valve according to claim 1, characterized in that said movable member is a disk coaxial with said piston and adapted to move along the axis of the latter within said chamber, the ends of the latter being connected to said inlet and outlet ports.

3. Safety valve according to claim 1, characterized in that said valve member is operatively connected to the disk of the movable member and is adapted to engage tightly a valve seat formed at one end of the chamber so as to close said outlet port.

* * * * *